Oct. 19, 1965    F. G. F. BEHLES ETAL    3,212,597
FRAME FOR MOTOR VEHICLES WITH FRONT WHEEL DRIVE
Filed Jan. 21, 1964    3 Sheets-Sheet 1

INVENTORS.
FRANZ G. F. BEHLES
JOSEF EIBL

BY *Dicke & Craig*
ATTORNEYS

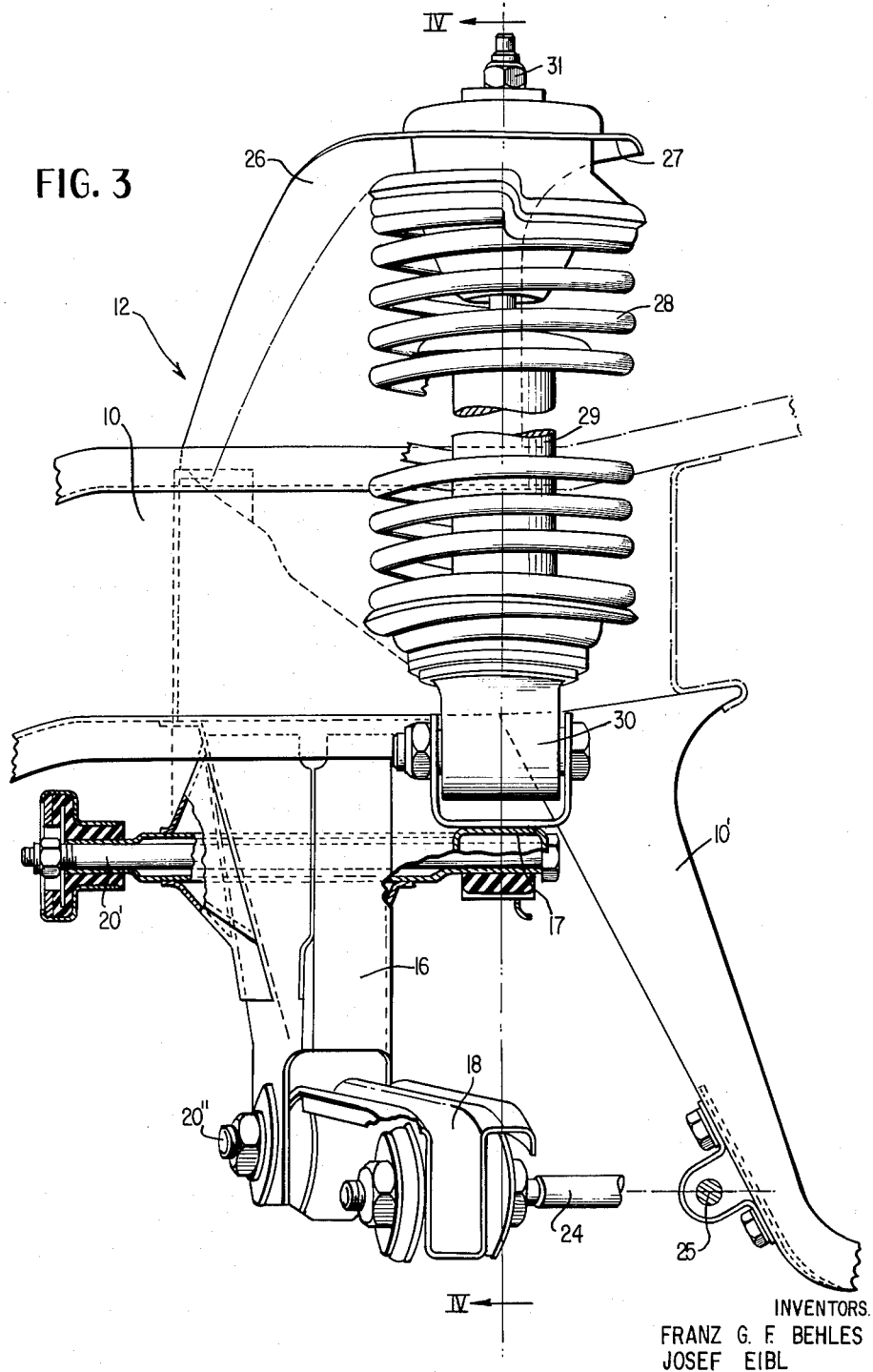

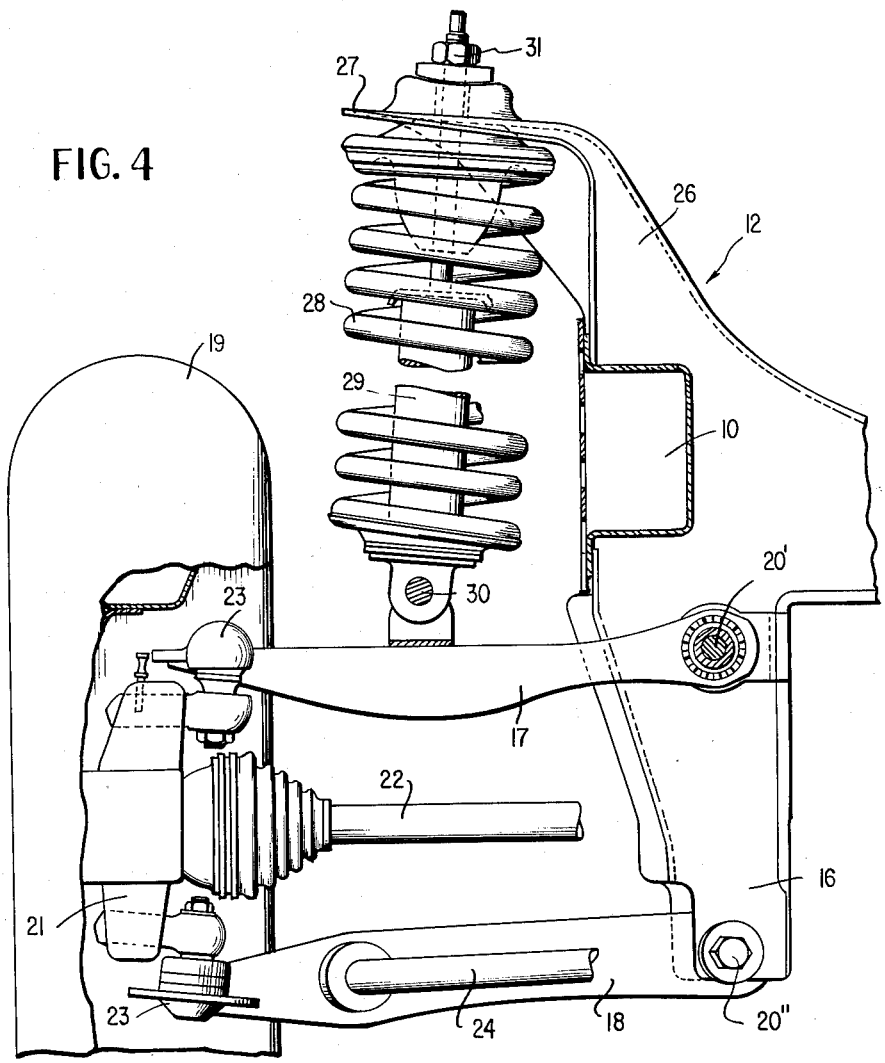

United States Patent Office 3,212,597
Patented Oct. 19, 1965

3,212,597
FRAME FOR MOTOR VEHICLES WITH FRONT WHEEL DRIVE
Franz G. F. Behles and Josef Eibl, Ingolstadt, Germany, assignors to Daimler-Benz Aktiengesellschaft
Filed Jan. 21, 1964, Ser. No. 339,209
Claims priority, application Germany, Jan. 23, 1963, D 40,744
11 Claims. (Cl. 180—42)

The present invention relates to a frame for motor vehicles with front-wheel drive which is basically composed of two longitudinal bearers connected with each other by means of several cross bearers.

With the known frame constructions of the type described above, at least one cross bearer and the longitudinal bearers extend within the area of the drive unit and of the drive connection or drive shaft line closer to the plane of the road surface than the drive shaft line and/or the drive unit. For that reason, the drive shaft line or drive connection has to be far-reachingly disassembled and disconnected from the differential gear for a dismantling and removal of the two last-mentioned vehicle parts; that is, of the drive shaft line and of the drive unit.

The aim of the present invention is a frame construction which enables a simple and facilitated dismantling and removal of the drive unit together with the half-axle drive shafts so that the assembly costs can be lowered and a disassembly of the delicate and oil-filled drive joints may be dispensed with.

The underlying problem is solved in accordance with the present invention in that with a frame of the type described above, the cross bearer disposed within the area of the drive shaft line resembles an H with the leg portions thereof pointing downwardly and upwardly, whereby the cross bearer, properly speaking, is constituted by the horizontal cross web portion of the H and the horizontal cross web portion is disposed higher than the drive unit and the drive shaft line.

With a construction of the frame in accordance with the present invention, exclusively a disengagement of those connections is required for purposes of dismantling and removing the aforementioned motor vehicle parts, by means of which the drive shaft line and the drive unit is secured at the frame, that is, for example, of the connection between the spring elements and the frame, the joints of the cross and longitudinal guide arms on the side of the frame as well as of the bearing supports and actuating members of the drive unit. After completion of these disengaging operations, the frame together with the vehicle body can be lifted up without difficulty from the drive unit and the drive shaft line.

According to the present invention, at least the downwardly directed leg portions of the cross bearer are disposed in front of the drive shaft line and the two longitudinal bearer members, after piercing this cross bearer member in the connecting places of the leg portions with the cross web portion, extend over the drive shaft line. The longitudinal bearer members then drop behind the drive shaft lines to the level or height of the lower edge of the vehicle body. Additionally, the advantage results from the frame construction in accordance with the present invention that the inclined forward terminal wall of the passenger foot space is supported by the sturdy longitudinal bearer members themselves so that in case of accidents, a protection of the passenger space results therefrom.

By the extension of the upper lateral leg portions of the cross bearer member according to the present invention in the upward direction, that is, by the H-shaped construction of this bearer member and by a construction of the upper ends thereof as spring-support dishes or the like, the spring elements of the front wheels are supported exclusively on the frame and not on parts of the floor assembly of the vehicle body.

Accordingly, it is an object of the present invention to provide a frame for motor vehicles with front wheel drive which avoids by simple and expedient means the aforementioned disadvantages encountered with the prior art constructions.

It is another object of the present invention to provide a frame assembly for front-wheel drive motor vehicles which enables simple disassembly and facilitated dismantling of the drive unit together with the drive shaft lines including the half-axles driving the wheels.

Another object of the present invention resides in the provision of a frame construction for motor vehicles having a front wheel drive which permits simple and easy assembly and disassembly of the drive unit and drive connection from the drive unit to the front wheels without requiring disassembly of delicate, sensitive and oil-filled drive joints or the like that may be damaged during disassembly.

Still another object of the present invention resides in the provision of a frame for motor vehicles with front wheel drive which decreases the cost of installation and particularly the cost of removal and dismantling as regards the drive unit and/or drive connection from the drive unit to the front wheels.

Still a further object of the present invention resides in the provision of a frame construction for vehicles with front wheel drive which enables a removal of the drive unit and drive connections from the frame by simply detaching those connections by means of which the drive unit and/or drive connections are secured to the frame.

A further object of the present invention resides in the provision of a frame construction which permits upward lifting of the frame together with the vehicle body from the drive unit and drive connection without difficulties.

Still another object of the present invention resides in the provision of a motor vehicle frame construction which offers enhanced protection to the passenger foot space, particularly against forces coming from in front of the vehicle.

Another object of the present invention resides in the provision of a frame construction for front wheel drive motor vehicles in which the spring elements of the front wheels are supported exclusively against the frame without spring abutment against any of the floor parts of the body.

Still a further object of the present invention resides in the provision of a frame construction for motor vehicles with front wheel drive in which the caster of the front wheels is automatically reduced when driving through a curve thereby facilitating steering of the vehicle in curves.

These and other objects, features and advantages of the present invention will become more obvious from the following description when taken in connection with the accompanying drawing which shows, for purposes of illustration only, one embodiment in accordance with the present invention, and wherein:

FIGURE 3 is a side elevational view, partly in cross section, of the H-shaped cross bearer member of the frame in accordance with the present invention, and FIGURE 4 is a partial cross-sectional view through the front wheel suspension taken along line IV—IV of FIGURE 3.

Figure 1:
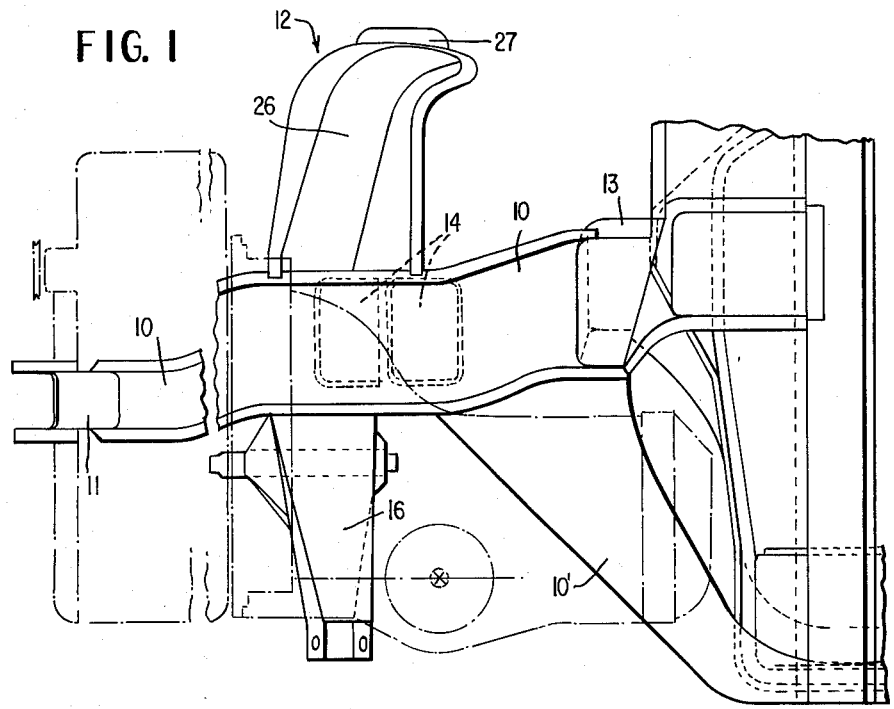
FIGURE 1 is a partial side elevational view of a frame in accordance with the present invention.
Figure 2:
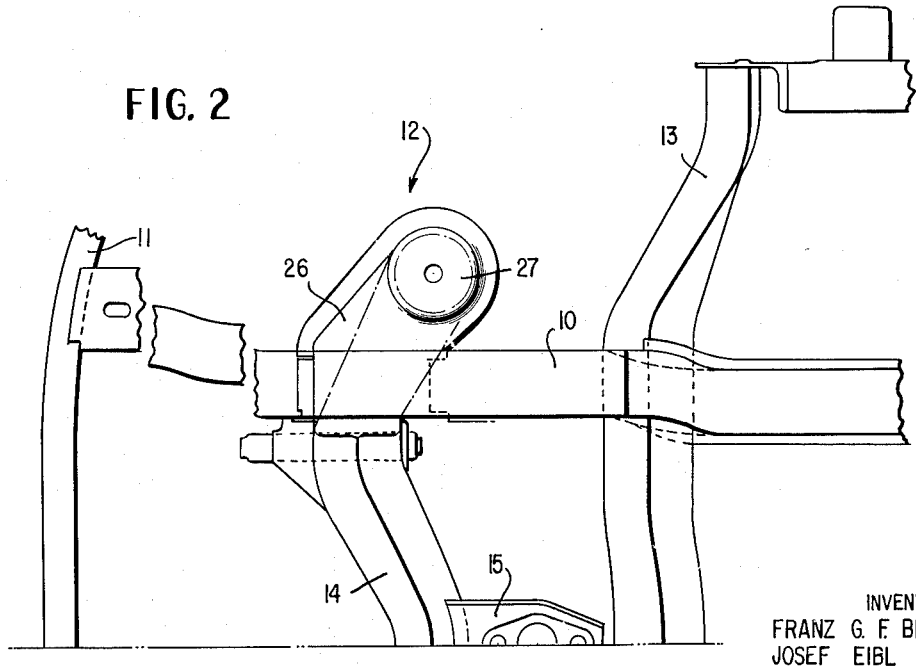
FIGURE 2 is a partial plan view on the frame of FIGURE 1 in accordance with the present invention.

Referring now to the drawing wherein like reference numerals are used throughout the various views to designate like parts, and more particularly to FIGURES 1 and 2, the front part of the frame according to the present invention for a motor vehicle with a front wheel drive illustrated therein is formed by two longitudinal bearer members 10 as well as cross bearer members 11, 12 and 13. The inclined sections 10' of the longitudinal bearer members 10 form together with the cross bearer 13 the forward boundary of the passenger foot space. The cross bearer member generally designated by reference numeral 12 which is approximately W-shaped in plan view (FIG. 2), extends with the cross web portion 14 thereof over the drive unit—not shown in detail herein—and receives with the bracket or outrigger 15 thereof the rear support for the drive unit.

As shown in FIGURE 3 and particularly in FIGURE 4, the cross guide arms 17 and 18 for the front wheels 19 are pivotally connected at the downwardly directed leg portions 16 of the cross bearer 12 which are disposed in front of the drive connection or drive shaft lines 22 leading to the wheels 19. The leg portions 16 have a box-shaped cross section which accommodates with a tubular sleeve the bolt 20' for the pivotal connection of the upper guide arm 17. The leg portions 16 are provided at the lower ends thereof with an essentially U-shaped cross section for purposes of accommodating the lower cross arm 18 and connecting the same at point 20''. The wheel carrier 21 of the front wheel 19 driven by means of a half-axle drive shaft 22 is pivotally connected to these cross guide arms 17 and 18 by means of ball joints 23 (FIG. 4). A stabilizer 24 extending from the lower cross guide arm 18 is supported at 25 (FIG. 3) at the inclined part 10' of the longitudinal bearer member 10.

By the use of a frame construction according to the present invention, an inclination results for the lower cross guide arm 17 with respect to the vehicle transverse plane in such a manner that the longitudinal axis thereof extends from the pivotal connection at the frame side obliquely toward the rear. The stabilizer arm 24, in contrast thereto, extends from a point near the wheel of the cross guide arm 18 rearwardly and inwardly. Consequently, a larger moment occurs at the lower cross guide arm 18 of the wheel disposed on the outside of the curve whereby the caster of this wheel is reduced. As a result thereof, the forces to be applied to the steering while driving through a curve are considerably reduced.

The overall construction of the cross bearer 12, which consists of portions 14, 16, 26 is in the form of an H, if one visualizes in FIGURE 4 that the other side of the frame is symmetrically constructed. The downwardly directed leg portion 16 of cross bearer 12 is of box-shaped construction in the upper area thereof, that is, approximately within the area of the pivotal connection of the upper guide arm 17. However, at the lower end thereof, one lateral wall of the box-shaped leg portion 16 is omitted in order to enable pivotal connection of the lower guide arm 18 at the bolt 20'' as shown in FIGURE 3. In other words, the leg portion 16 has a U-shaped cross section within this area if one visualizes a cross sectional view in a plane through the axis of bolt 20'' and parallel to the road surface.

The overall H-shaped construction of the cross bearer 12 is visible particularly well from FIGURE 4. The cross bearer 12 as shown in this figure is provided in the upward extension of the downwardly directed leg portions 16 with like portions 26 (FIGS. 1, 3 and 4), the upper ends of which are constructed as spring abutments or spring dishes 27. The longitudinal bearer members 10 pierce the cross bearer 12 at the connecting places of the horizontal cross web portion 14 with the leg portions 16 and 26. A hydraulic suspension unit or spring leg consisting of a coil spring 28 and a shock absorber 29 is supported at top thereof against the spring dish 27 and at the bottom thereof is pivotally supported in joint 30 on the upper cross guide arm 17.

For purposes of disassembly and dismantling of the drive unit and drive connection or drive shaft line out of the motor vehicle, one proceeds as follows:

After disengagement or detachment of the connection 31 between the spring leg 28, 29 and the upper spring dish 27 or of the lower joint 30, after disassembly of the joints 20', 20'' and 25 as well as of the frame supports and actuating members of the drive unit, the entire frame together with the longitudinal bearers 10 and cross bearer 12 extending over the drive connection as well as the vehicle body is lifted out of the vehicle parts to be removed or disassembled.

While we have shown and described one embodiment in accordance with the present invention, it is understood that the same is not limited thereto, but is susceptible of numerous changes and modifications within the spirit and scope thereof as known to a person skilled in the art, and we therefore do not wish to be limited to the details shown and described herein, but intend to cover all such changes and modifications as are encompassed by the scope of the appended claims.

We claim:

1. A frame for motor vehicles with a front wheel drive that includes a drive unit operatively connected with the front wheels by way of drive shafting means, comprising:
   two longitudinal bearer means,
   a plurality of cross bearer means interconnecting said longitudinal bearer means,
   one of said cross bearer means disposed within the area of the drive shafting means being of approximately downwardly directed U-shaped cross section and having leg portions and a cross web portion, the cross bearer member being constituted by the said cross web portion and said cross web portion being disposed higher than the drive unit and drive shafting means,
   the two longitudinal bearer means being also disposed within the area of the drive shafting means higher than the drive shafting means, piercing said one cross bearer means at the connecting places between the leg portions and the cross web portion thereof, and dropping to about the height of the lower edge of the vehicle body to the rear of the said one cross bearer means.

2. A frame for motor vehicles with a front wheel drive that includes a drive unit operatively connected with the front wheels by way of drive shafting means and upright spring means for spring supporting the driven front wheels of the vehicle, comprising:
   two longitudinal bearer means,
   a plurality of cross bearer means interconnecting said longitudinal bearer means,
   one of said cross bearer means disposed within the area of the drive shafting means being of approximately downwardly directed U-shaped cross section and having a plurality of leg portions and a cross web portion, the cross bearer member being constituted by the said cross web portion and said cross web portion being disposed higher than the drive unit and drive shafting means,
   at least a pair of the leg portions of said one cross bearer means being downwardly directed and arranged in front of the drive shafting means,
   said cross bearer means being so constructed by extending a pair of the lateral leg portions thereof in the upward direction as to form an approximately H-shaped upright bearer with said downwardly directed like portions, the upper part of said H-shaped bearer being extended up to the spring means and the upper ends thereof forming dish-shaped spring abutments for supporting thereon the spring means.

3. A frame for motor vehicles with a front wheel drive that includes a drive unit operatively connected with the front wheels by way of drive shafting means and having upper and lower wheel guide arms, comprising:
- two longitudinal bearer means,
- a plurality of cross bearer means interconnecting said longitudinal bearer means,
- wheel suspension means for the driven front wheels including upper and lower cross guide arms,
- one of said cross bearer means disposed within the area of the drive shafting means being of approximately downwardly directed U-shaped cross section and having leg portions and a cross web portion, the cross bearer member being constituted by the said cross web portion and said cross web portion being disposed higher than the drive unit and drive shafting means,
- the lower end of the leg portions of said one cross bearer means having an approximately U-shaped cross section for the pivotal connection of the lower front wheel cross guide arms, and the U-shaped cross section of the leg portions opening away from the vehicle longitudinal center plane.

4. A frame for motor vehicles with a front wheel drive that includes a drive unit operatively connected with the front wheels by way of drive shafting means, comprising:
- two longitudinal bearer means,
- a plurality of cross bearer means interconnecting said longitudinal bearer means,
- one of said cross bearer means disposed within the area of the drive shafting means being of approximately downwardly directed U-shaped cross section and having leg portions and a cross web portion, the cross bearer member being constituted by the said cross web portion and said cross web portion being disposed higher than the drive unit and drive shafting means,
- the drive unit being disposed in front of the front axle, and said one cross bearer means being provided with rearwardly directed bracket means extending rearwardly from the cross web portion thereof for accommodating the engine rear bearing support.

5. A frame for motor vehicles with a front wheel drive that includes a drive unit operatively connected with the front wheels by way of drive shafting means and upright spring means for spring supporting the driven front wheels of the vehicle, comprising:
- two longitudinal bearer means,
- a plurality of cross bearer means interconnecting said longitudinal bearer means,
- wheel suspension means for the driven front wheels including upper and lower cross guide arms,
- one of said cross bearer means disposed within the area of the drive shafting means being of approximately downwardly directed U-shaped cross section and having leg portions and an approximately horizontal cross web portion, the cross bearer member being constituted by the said cross web portion and said cross web portion being disposed higher than the drive unit and drive shafting means,
- the two longitudinal bearer means being also disposed within the area of the drive shafting means higher than the drive shafting means, piercing said one cross bearer means at the connecting places between the leg portions and the web portion thereof, and dropping to approximately the height of the lower edge of the vehicle body to the rear of said one cross bearer means,
- at least a pair of the leg portions of said one cross bearer means being downwardly directed and arranged in front of the drive shafting means,
- said cross bearer means being so constructed by extending a pair of the lateral leg portions thereof in the upward direction as to form an approximately H-shaped upright bearer with said downwardly directed like portions, the upper part of said H-shaped bearer being extended up to the spring means and the upper ends thereof forming dish-shaped spring abutments for supporting thereon the spring means,
- the lower ends of the leg portions of said one cross bearer means having an approximately U-shaped cross section for the pivotal connection of the lower front wheel cross guide arms, and the aperture of the U-shaped cross section of the leg portions being opposite the vehicle longitudinal center plane,
- the drive unit being disposed in front of the front axle, and said one cross bearer means being provided with rearwardly directed bracket means extending rearwardly from the cross web portion thereof for accommodating the engine rear bearing support.

6. A frame for motor vehicles with a front wheel drive that includes a drive unit operatively connected with the front wheels by way of drive shafting means, comprising:
- two longitudinal bearer means,
- a plurality of cross bearer means interconnecting said longitudinal bearer means,
- one of said cross bearer means disposed within the area of the drive shafting means being of approximately downwardly directed U-shaped cross section and having downwardly directed leg portions and an approximately horizontal cross web portion, the cross bearer member being constituted by the said cross web portion and said cross web portion being disposed higher than the drive unit and drive shafting means,
- the two longitudinal bearer means being also disposed within the area of the drive shafting means higher than the drive shafting means, piercing said one cross bearer means at the connecting places between the leg portions and the cross web portion thereof, and dropping to about the height of the lower edge of the vehicle body to the rear of said U-shaped cross bearer means,
- at least the downwardly directed leg portions of said one cross bearer means being arranged in front of the drive shafting means.

7. A frame for motor vehicles with a front wheel drive that includes a drive unit operatively connected with the front wheels by way of drive shafting means and upright spring means for spring supporting the driven front wheels of the vehicle, comprising:
- two longitudinal bearer means,
- a plurality of cross bearer means interconnecting said longitudinal bearer means,
- one of said cross bearer means disposed within the area of the drive shafting means being of approximately downwardly directed U-shaped cross section and having a plurality of leg portions and an approximately horizontal cross web portion, the cross bearer member being constituted by the said cross web portion and said cross web portion being disposed higher than the drive unit and drive shafting means,
- the two longitudinal bearer means being also disposed within the area of the drive shafting means higher than the drive shafting means, piercing said one cross bearer means at the connecting places between the leg portions and the cross web portion thereof, and dropping to about the height of the lower edge of the vehicle body to the rear of said one cross bearer means,
- at least a pair of the leg portions of said one cross bearer means being downwardly directed and arranged in front of the drive shafting means,
- said one cross bearer means being so constructed by extending a pair of the lateral leg portions thereof in the upward direction as to form an approximately H-shaped upright bearer with said downwardly directed leg portions, the upper part of said H-shaped bearer being extended up to the spring means and the upper ends thereof forming dish-shaped spring abutments for supporting thereon the spring means.

8. In a motor vehicle with a front wheel drive having a drive unit operatively connected with the front wheels by way of drive shafting lines including half-axle drive shafts, and a frame composed of two substantially longitudinal bearers and a plurality of cross bearers, the improvement essentially consisting of arranging one of said cross bearers within the area of the drive unit, said one cross bearer having an approximately downwardly directed U-shaped cross section and being provided with leg portions and an approximately horizontal cross web portion, and said cross web portion being disposed higher than the drive unit and said shafting lines, and said longitudinal bearers combining to the rear of said one cross bearer with another cross bearer to form therewith the boundary of the foot space of the passenger compartment.

9. In a motor vehicle with a front wheel drive having a drive unit operatively connected with the front wheels by way of drive shafting lines including half-axle drive shafts, and a frame composed of two substantially longitudinal bearers and a plurality of cross bearers, the improvement essentially consisting of arranging one of said cross bearers within the area of the drive unit, said one cross bearer having an approximately downwardly directed U-shaped cross section and being provided with leg portions and an approximately horizontal cross web portion, and said cross web portion being disposed higher than the drive unit and said shafting lines, and suspension means for the front wheels including superposed cross guide arms for each wheel and a stabilizer rod, the lower cross guide arm being pivotally connected to said one cross bearer in such a manner that it extends obliquely to the rear from the point of pivotal connection at the one cross bearer while the stabilizer rod is operatively connected with the lower cross guide arm in such a manner that it extends rearwardly inwardly from the connection at the lower cross guide arm whereby the castor of the wheel on the outside of the curve is automatically decreased when driving through the curve.

10. In a motor vehicle with a front wheel drive having a drive unit operatively connected with the front wheels by way of drive shafting lines including half-axle drive shafts, and a frame composed of two substantially longitudinal bearers and a plurality of cross bearers, the improvement essentially consisting of arranging one of said cross bearers within the area of the drive unit, said one cross bearer having an approximately downwardly directed U-shaped cross section and being provided with leg portions and an approximately horizontal cross web portion, and said cross web portion being disposed higher than the drive unit and said shafting lines, and suspension means for the front wheels including superposed cross guide arms for each wheel and a stabilizer rod, the lower cross guide arm being pivotally connected to said one cross bearer in such a manner that it extends obliquely to the rear from the point of pivotal connection at the one cross bearer while the stabilizer rod is operatively connected with the lower cross guide arm in such a manner that it extends rearwardly inwardly from the connection at the lower cross guide arm whereby the castor of the wheel on the outside of the curve is automatically decreased when driving through the curve, and spring means operatively connected at the one end to the respective lower cross guide arm and at the other end thereof to upper extensions of the leg portions of the one cross bearer which are formed into dish-shaped spring abutments for supporting thereon the spring means.

11. In a motor vehicle with a front wheel drive having a drive unit operatively connected with the front wheels by way of drive shafting lines including half-axle drive shafts, and a frame composed of two substantially longitudinal bearers and a plurality of cross bearers, the improvement essentially consisting of arranging one of said cross bearers within the area of the drive unit, said one cross bearer having an approximately downwardly directed U-shaped cross section and being provided with leg portions and an approximately horizontal cross web portion, and said cross web portion being disposed higher than the drive unit and said shafting lines, the two longitudinal bearers being also disposed higher within the area of the shafting lines than the latter and piercing said one cross bearer near the connecting places between the leg portions and the cross web portion thereof, and said longitudinal bearers combining to the rear of said one cross bearer with another cross bearer to form therewith the boundary of the foot space of the passenger compartment, and suspension means for the front wheels including superposed cross guide arms for each wheel and a stabilizer rod, the lower cross guide arm being pivotally connected to said one cross bearer in such a manner that it extends obliquely to the rear from the point of pivotal connection at the one cross bearer while the stabilizer rod is operatively connected with the lower cross guide arm in such a manner that it extends rearwardly inwardly from the connection at the lower cross guide arm whereby the castor of the wheel on the outside of the curve is automatically decreased when driving through the curve, and spring means operatively connected at the one end to the respective lower cross guide arm and at the other end thereof to upper extensions of the leg portions of the one cross bearer which are formed into dish-shaped spring abutments for supporting thereon the spring means.

References Cited by the Examiner

UNITED STATES PATENTS

| | | | |
|---|---|---|---|
| 2,403,145 | 7/46 | Ulrich | 280—106.5 |
| 2,746,556 | 5/56 | Nallinger | 180—42 X |
| 2,858,142 | 10/58 | Schjolin | 180—42 X |
| 3,042,133 | 7/62 | Ordorica | 180—43 |

A. HARRY LEVY, *Primary Examiner.*

LEO FRIAGLIA, *Examiner.*